March 1, 1966     M. S. JAFFE     3,238,407
MATRIX FOR ELECTROLUMINESCENT CELLS
Filed Dec. 10, 1957
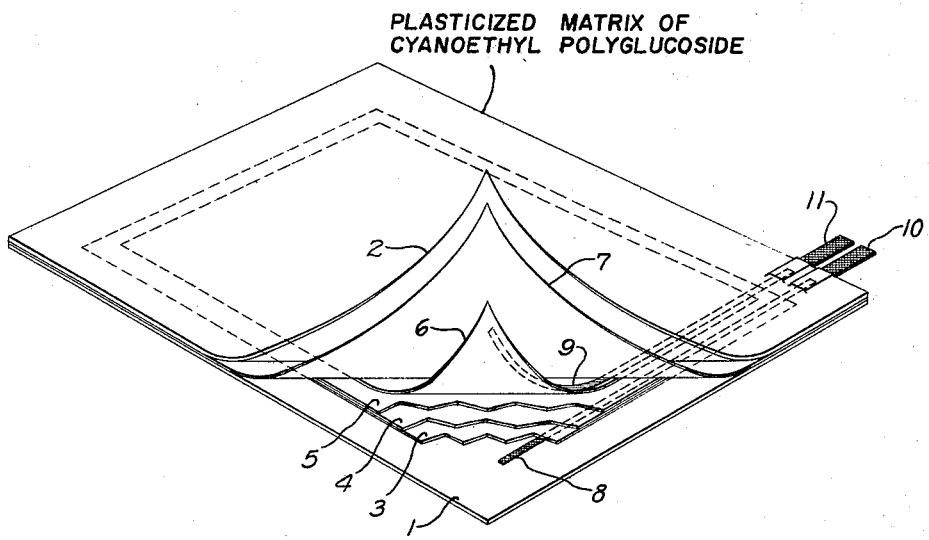
Inventor:
Mary S. Jaffe,
by   Ernest W. Legree
Her Attorney.

United States Patent Office 3,238,407
Patented Mar. 1, 1966

3,238,407
MATRIX FOR ELECTROLUMINESCENT CELLS
Mary S. Jaffe, Cleveland Heights, Ohio, assignor to General Electric Company, a corporation of New York
Filed Dec. 10, 1957, Ser. No. 701,907
8 Claims. (Cl. 313—108)

This invention relates in general to electroluminescent lamps wherein an electroluminescent phosphor is sandwiched between a pair of conductive coatings. More particularly the invention relates to an organic polymeric matrix in which an electroluminescent phosphor may be imbedded or dispersed to form the light producing layer of an electroluminescent cell or lamp.

In my Patent 2,774,004, Flexible Electroluminescent Laminated Panel, there is described and claimed an electroluminescent cell wherein a layer of an electroluminescent phosphor dispersed in a dielectric material is sandwiched between a pair of conductive layers. One of the conductive layers is a metal foil such as aluminum, and the other is a light-transmitting conductive sheet of glass fibers such as glass cloth or paper coated with an indium containing compound. When an alternating voltage is applied across the conductive layers, the phosphor produces light which is transmitted through the fibrous glass sheet. The plastic matrix binds the phosphor in place and permits laminating the various component layers of the cell together. The higher the dielectric constant of the matrix relative to the phosphor, the more the electric field will be concentrated across the phosphor crystals, and the greater will be the amount of light produced for the same voltage, phosphor and cell construction.

It has been found desirable to provide within an electroluminescent cell next to the electroluminescent phosphor layer, a layer of a high dielectric constant inorganic material such as barium titanate to serve as an insulating layer. The insulating layer is preferably disposed next to the metal foil and comprises an organic polymeric matrix in which the inorganic material is dispersed or imbedded. Here also it has been found that the brightness of the cell is increased by using materials of the highest dielectric constant for both the inorganic material and the organic matrix.

The object of the invention is to provide an improved electroluminescent cell construction with regards to the plastic matrix in which the electroluminescent phosphor is imbedded.

Another object of the invention is to provide a plastic matrix for electroluminescent cells giving higher brightness and better maintenance, that is, less deterioration in performance during the life of the cell.

A further object of the invention is to provide a new and improved process for making a film of electroluminescent phosphor dispersed in a plastic matrix in accordance with the invention.

Yet a further object of the invention is to provide a new and improved polymeric plastic matrix suitable for dispersing a high dielectric constant inorganic material in the insulating layer of an electroluminescent cell.

In accordance with the invention, I provide an organic polymeric matrix for the electroluminescent phosphor layer or for the insulating layer of an electroluminescent cell consisting principally of a cyanoethylated polyglucoside such as cyanoethyl cellulose made either from natural cotton or from regenerated cellulose such as rayon, or cyanoethyl starch of the general formula $(C_6H_9O_5)_x \cdot (CH-CH-CN)_y$.

The single figure of the drawing is a pictorial view of an electroluminescent cell or lamp embodying the invention, one corner being peeled open or delaminated to show the internal construction.

There are several powerful solvents for cyanoethyl polyglucosides, for instance dimethyl formamide, $\gamma$-butyrolactone, ethylene and propylene carbonates, N-methyl pyrrolidone, and dimethyl sulfoxide. However, when it is attempted to disperse the phosphor directly into such solutions, the solvents cause the phosphor to flocculate severely, and electroluminescent cells made with a cyanoethyl cellulosephosphor layer so prepared light up in a dim and spotty manner.

I have discovered that if the phosphor is first mulled to a paste with a small amount of a suitable plasticizer, it can thereafter be dispersed into a cyanoethyl polyglucoside solution without difficulty. A suitable commercially available plasticizer is a chlorinated aromatic liquid consisting of chlorinated biphenyl of dielectric constant 5.0 and described in publication O–P–115 of Monsanto Chemical Company published in 1955. Other suitable plasticizers are methoxyethyl oleate, and di-N-butyl phthalate. Other plasticizers which may be used are dibutyl tartrate and di-iso-octyl phthalate; however the former causes more lossy electrical characteristics, and the latter tends to exude out of the cyanoethyl cellulose when its concentration exceeds 20% by volume.

A preferred plasticizer in which the phosphor may be mulled is cyanoethyl phthalate described and claimed in co-pending application Ser. No. 701,720, of myself jointly with Robert V. Levetan entitled High Dielectric Constant Plasticizers and assigned to the same assignee as the present invention, now Patent 2,951,865. In this particular combination, the fact that both plasticizer and plastic are cyanoethylated undoubtedly makes them mutually more compatible than chemically dissimilar materials would be.

The dispersion of phosphor in the cyanoethyl polyglucoside solution may be used to make the phosphor layer of an electroluminescent cell by depositing a thin even layer thereof on a suitable base. This may be done in various ways, for instance by spraying, or through use of a doctor blade. After the solvent has evaporated, a thin even layer of phosphor dispersed in a matrix of cyanoethyl polyglucoside remains and the phosphor may be excited by the application of an alternating voltage across the layer. The dielectric constant of the matrix is approximately 20 and may be higher depending upon choice of plasticizer; with cyanoethyl phthalate as the plasticizer, the dielectric constant will exceed 20. The brightness of the cell, other conditions being equal, will vary with the dielectric constant of the matrix, and cells using a cyanoethyl polyglucoside matrix in accordance with the present invention achieve much higher brightness than prior art cells.

I have also discovered that a cyanoethyl polyglucoside may also be used as the matrix for an insulating layer of a high dielectric constant inorganic material such as barium titanate or titanium dioxide. The inorganic material in powdered form is first mulled into a suitable plasticizer and then mixed into a cyanoethyl polyglucoside solution, in like fashion to the phosphor, and a layer thereof then laid on a suitable base.

The following examples illustrate the preparation of a phosphor layer in a cyanoethyl polyglucoside matrix in accordance with the invention:

Example 1

100 grams of a green-emitting electroluminescent phosphor such as zinc sulfide-zinc oxide activated with copper and chlorine are moistened with 26 grams of γ-butyrolactone. To this are added 35.2 grams of chlorinated biphenyl (Aroclor 1248, Monsanto Chemical Co.) and the mixture is stirred to a pasty slurry. Then 293 grams of a 10% solution of cyanoethylated cellulose made from regenerated cellulose, e.g. rayon staple, in a solvent mixture of equal weights of acetone and dimethyl formamide are placed in a high-speed agitator and the phosphor slurry is slowly added and beaten in. Small portions of solvent are used to rinse the slurry vessel into the agitator until 526 grams of solvent have been used in all, counting the slurry solvent, the plastic solution-solvent, and the rinse solvent. The mixture is beaten vigorously for five minutes, and then kept rolling until ready to coat. Coating may be effected through the use of a doctor blade. A layer 0.013 in. wet thickness will dry to about 0.0012 in. thick. This coating is suitable for use in series with an insulating layer, for instance 0.00025 in. of polyethylene terephthalate film (Dupont Mylar), or an anodized aluminum sheet, or on one of the $BaTiO_3$ or $TiO_2$ layers described in subsequent examples herein. If used between bare aluminum foil and a translucent electrode such as evaporated metal or semiconductor on a plastic film, or conducting glass cloth or paper, then the layer should be cast about 0.022 in. wet thickness to prevent shorting of the cell on excitation with 110–120 volts A.C.

Example 2

100 grams of a yellow-emitting electroluminescent phosphor, such as zinc sulfide activated with copper and manganese described and claimed in Patent 2,743,239, Froelich, are placed in a tube of suitable dimensions to just accept the blades of a stirrer having twin counter-rotating blades. This tube is provided with a side arm with stopcock, and is attached to a vacuum system. The dry phosphor is pumped at a pressure of about 1 micron Hg, while being radiantly heated to about 100° C. The phosphor is cooled under vacuum to room temperature and left under vacuum though closed from the pump. Into the side arm is introduced a mixture of 30 grams of β-cyanoethyl phthalate and 30 grams of dimethyl formamide. The closed vessel is agitated with a vibrator to outgas the phosphor. The vessel is removed from the vacuum; to it is added 293 grams of a 10% solution of cyanoethyl cellulose in a solvent composed of equal weights of γ-butyrolactone, dimethyl formamide, methylethyl ketone, and acetone. The counter rotating stirrer is inserted into the mix and the mix agitated vigorously until smooth. Solvent is added to a total of 324 grams. The mix is coated 0.010 in. wet to give a dry thickness of about 0.0012 in., suitable for coating on substrates of $BaTiO_3$ or $TiO_2$ as subsequently described herein. For use on bare aluminum it should be nearly twice as thick.

Example 3

100 grams of electroluminescent phosphor such as a zinc-sulfide zinc oxide copper activated phosphor are stirred with 21.5 grams of α-cyanoethyl phthalate and 20 grams of dimethyl formamide. The paste is added slowly to 217 grams of 10% cyanoethyl cellulose in a solvent composed of equal weights of acetone, dimethyl formamide, and methylethyl ketone, while stirring in a high speed agitator. The vessel containing the paste is rinsed into the agitator with small portions of solvent until a total of 355 grams of solvent have been added. The mixture is coated 0.0075 in. wet on an insulating substrate of $BaTiO_3$ or $TiO_2$ as described subsequently herein.

Example 4

100 grams of electroluminescent phosphor are mixed with 20 grams of α-cyanoethyl phthalate and 20 grams of methylethyl ketone solvent. The mix is beaten into 66.5 grams of a 30% solution of cyanoethylated cornstarch in dimethyl formamide. Enough solvent (equal weights of methylethyl ketone and acetone) is added to bring the total solvent weight to 85 grams. The mix is coated on an insulating substrate as described subsequently herein.

Example 5

100 grams of electroluminescent phosphor are mixed with 20 grams of methoxyethyl oleate (Kapsol plasticizer, Ohio Apex Division, Food Machinery & Chemical Corp.) and 20 grams of methylethyl ketone. The mix is beaten into 200 grams of a 10% solution of cyanoethylated cellulose and used as in the other phosphor examples.

Example 6

100 grams of phosphor are mixed with 20 grams of bis (O-chlorophenyl) phenyl phosphate (Phosphen–4, Dow Chemical Co.), beaten into 200 grams of a 10% solution of cyanoethylated cellulose, and used as in the other examples.

Example 7

100 grams of electroluminescent phosphor are mixed with 20 grams of di-N-butyl phthalate and 20 grams of solvent. This mixture is beaten into 200 grams of a 10% solution of cyanoethylated cellulose, and used as in the other examples.

The following examples illustrate the preparation of an inslating layer of an inorganic powder in a cyanoethyl polyglucoside matrix in accordance with the invention:

Example 8

100 grams of pigment grade rutile titanium dioxide in toluene is ball-milled in a one-quart mill and filtered. The filter cake is rinsed twice with dimethyl formamide without being allowed to dry. The damp filter cake is placed in a dish to which are added 16.4 grams of α-cyanoethyl phthalate; the two are mixed to a paste. This paste is slowly added to 157 grams of a 10% solution of cyanoethyl cellulose in a solvent composed of equal weights of acetone, methylethyl ketone, and dimethyl phthalate placed in a high speed agitator. The vessel containing the paste is rinsed with small additional portions of solvent until 214 grams of solvent have been used in all. This mixture is coated 0.005 in. wet on a suitable substrate such as aluminum foil by the use of a doctor blade. After drying to expel the solvent, this gives a coating about 0.0008 in. thick. This coating is a suitable substrate for the phosphor coatings in the examples previously given.

Example 9

100 grams of purest commercial grade barium titanate in toluene are ball-milled 24 hours in a one-quart mill with high density balls. The damp filter cake is rinsed with dimethyl formamide and then is mixed with 12.8 grams of chlorinated biphenyl (Aroclor 1254, Monsanto Chemical Co.). The paste is rinsed into 103 grams of 10% cyanoethyl cellulose in the solvents of the previous example in a high-speed agitator and dispersed as before, 233 grams of solvent being used in all. The mix is coated 0.011 in. wet to give a dry thickness of about 0.001 in., and is suitable for a substrate for a phosphor coating.

Example 10

100 grams of purest commercial grade barium titanate are milled 24 hours in toluene, filtered, and rinsed twice with a mixture of equal weights of acetone, methylethyl ketone, and dimethyl formamide. The damp filter cake is stirred to a paste with 10.5 grams of α-cyanoethyl phthalate, and this paste is rinsed into 100 grams of a stirring solution of 10% cyanoethyl cellulose as in Example 8, a total of 180 grams of solvent being used in all. This mix when coated 0.007 in. wet gives a coating about 0.0011 in. dry, suitable as a substrate for phosphor coatings.

The single figure of the drawing illustrates a completed electroluminescent lamp embodying the invention and generally constructed as described and claimed in copending application Serial No. 701,906 filed of even date herewith of Elmer G. Fridrich and Paul A. Dell entitled Electroluminescent Lamp and Manufacture Thereof, and assigned to the same assignee as the present invention, now Patent 2,945,976.

The lamp comprises an electroluminescent cell encapsulated between sheets 1, 2 of thermoplastic material which are sealed or welded together along their margin. Thermoplastic materials particularly suitable for this purpose are polyethylene and polychloro-trifluoroethylene. On the lower thermoplastic sheet 1 is placed a sheet of thin aluminum foil 3 which serves as one electrode. The foil is coated with an insulating layer 4 of a high dielectric constant material which in turn is overcoated with a light-producing layer 5 of an electroluminescent phosphor. In accordance with the invention, both electrically active layers, that is insulating layer 4 and phosphor layer 5, consist of dispersions of the inorganic powders in a cyanoethylated polyglucoside with a suitable plasticizer according to the examples previously given. In a preferred construction the insulating layer 4 consists of a dispersion of barium titanate in cyanoethylated cellulose plasticized with α-cyanoethyl phthalate, and the phosphor layer 5 consists of an electroluminescent phosphor likewise dispersed in a matrix of cyanoethylated cellulose plasticized with α-cyanoethyl phthalate. A sheet of conducting glass paper 6 is laid over the phosphor layer and serves as the transparent or at least light-transmitting electrode of the lamp. Aluminum foil 3, insulating layer 4, phosphor layer 5 and conducting glass paper 6 together form the active element or electroluminescent cell proper of the lamp.

For ease of lamination and improved adherence of the various layers, a sheet 7 of low density polyethylene may be laid over the glass paper 6 and serves to penetrate the gass paper and cement it to the phosphor layer when the assembly is laminated under heat and pressure. For convenience in energizing the lamp, there are provided copper ribbons 8, 9, the former being laid under the aluminum foil 3 between the foil and lower envelope sheet 1, and the latter being laid over the conductive glass paper 6, that is between the glass paper and low density polyethylene sheet 7. The copper ribbons extend substantially to the edge of the thermoplastic envelope sheets at one end and there overlie respectively a pair of laterally projecting copper screens 10, 11 which serve as contact terminals.

Various modifications of the electrically active elements constituting the electroluminescent cell proper and which, in the illustrated embodiment, consists of insulating layer 4 and phosphor layer 5 sandwiched between aluminum foil 3 and glass paper 6, may be made within the scope of the present invention. For instance, the glass paper 6 may be replaced by a sheet of polyethylene terephthalate (Dupont Mylar) coated with a conductive layer of evaporated metal. Also one may reverse the order of the layers and start with a sheet of conducting glass paper, lay down thereover a layer of phosphor in a cyanoethylated cellulose matrix, then a layer of barium titanate in a cyanoethylated cellulose matrix, then a foil or evaporated or dispersed metal or graphite layer thereover. Alternatively, one may cast separately the insulating and phosphor layers and laminate them to the aluminum foil under heat and pressure. If desired, suitable elements may be incorporated in the high dielectric constant material to color it, the insulating layer then being pigmented. The appended claims are intended to cover any such modifications coming within the true spirit and scope of the invention.

Having described my invention, what I desire to secure by Letters Patent is:

1. An electroluminescent cell comprising an electroluminescent phosphor layer sandwiched between a pair of conducting layers at least one of which is light-transmitting, said electroluminescent layer comprising a phosphor dispersed in a plasticized cyanoethyl polyglucoside matrix.

2. An electroluminescent cell comprising an electroluminescent phosphor layer sandwiched between a pair of conducting layers at least one of which is light-transmitting, said electroluminescent layer comprising a phosphor dispersed in a plasticized cyanoethyl cellulose matrix.

3. An electroluminescent cell comprising an electroluminescent phosphor layer sandwiched between a pair of conducting layers at least one of which is light-transmitting, said electroluminescent layer comprising a phosphor dispersed in a plasticized cyanoethyl starch matrix.

4. An electroluminescent cell comprising an electroluminescent phosphor layer sandwiched between a pair of conducting layers at least one of which is light-transmitting, said electroluminescent layer comprising a phosphor dispersed in a cyanoethyl polyglucoside matrix plasticized with cyanoethyl phthalate.

5. An electroluminescent cell comprising an electroluminescent phosphor layer and an insulating layer next thereto, said layers being sandwiched between a pair of conducting layers whereof at least the layer next to said electroluminescent layer is light-transmitting, said electroluminescent layer comprising a phosphor dispersed in a plasticized cyanoethyl polyglucoside matrix and said insulating layer comprising a high dielectric constant inorganic material dispersed in a plasticized cyanoethyl polyglucoside matrix.

6. An electroluminescent cell comprising an electroluminescent phosphor layer and an insulating layer next thereto, said layers being sandwiched between a pair of conducting layers whereof at least the layer next to said electroluminescent layer is light-transmitting, said electroluminescent layer comprising a phosphor dispersed in a plasticized cyanoethyl cellulose matrix and said insulating layer comprising a high dielectric constant inorganic material dispersed in a plasticized cyanoethyl cellulose matrix.

7. An electroluminescent cell comprising an electroluminescent phosphor layer and an insulating layer next thereto, said layers being sandwiched between a pair of conducting layers whereof at least the layer next to said electroluminescent layer is light-transmitting, said electroluminescent layer comprising a phosphor powder dispersed in a plastic matrix and said insulating layer comprising a high dielectric constant inorganic material dispersed in a plastic matrix, said plastic matrices consisting of cyanoethyl cellulose plasticized with cyanoethyl phthalate.

8. An electroluminescent cell comprising an electroluminescent phosphor layer and an insulating layer sandwiched between a pair of conducting layers whereof at least the layer next to said electroluminescent layer is light-transmitting, said insulating layer comprising a high dielectric constant inorganic material dispersed in a plasticized cyanoethyl polyglucoside matrix.

(References on following page)

References Cited by the Examiner

UNITED STATES PATENTS

| | | |
|---|---|---|
| 2,566,349 | 9/1951 | Mager. |
| 2,733,367 | 1/1956 | Gillson. |
| 2,765,419 | 10/1956 | Roberts. |
| 2,774,004 | 12/1956 | Jaffe. |
| 2,834,903 | 5/1958 | Roberts _____ 313—108 |
| 2,836,766 | 5/1958 | Holstead _____ 313—108 X |
| 2,837,660 | 6/1958 | Orthuber _____ 313—108 X |
| 2,851,634 | 9/1958 | Kazan. |
| 2,920,256 | 1/1960 | Lewis _____ 317—258 |

FOREIGN PATENTS 204,854    5/1955    Australia.

OTHER REFERENCES

"An EL Light-Amplifying Panel," by Kazan and Nicoll in I.R.E. Proceedings, December 1955, pp. 1888 to 1897.

GEORGE N. WESTBY, *Primary Examiner.*

RALPH G. NILSON, ARTHUR GAUSS, *Examiners.*

R. JUDD, J. J. McCORMACK, E. G. GERMAIN, L. D. BULLION, *Assistant Examiners.*